United States Patent
Sakai et al.

(10) Patent No.: US 6,692,548 B2
(45) Date of Patent: Feb. 17, 2004

(54) COPPER-BASED SLIDING MATERIAL, METHOD OF MANUFACTURING THE SAME, AND SLIDING BEARING

(75) Inventors: Kenji Sakai, Nagoya (JP); Naohisa Kawakami, Nagoya (JP); Satoru Kurimoto, Nagoya (JP); Takashi Inaba, Nagoya (JP); Koichi Yamamoto, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 09/887,087

(22) Filed: Jun. 25, 2001

(65) Prior Publication Data

US 2002/0026855 A1 Mar. 7, 2002

(30) Foreign Application Priority Data

Jul. 24, 2000 (JP) ........................................ 2000-222183

(51) Int. Cl.[7] .............................. C22C 1/05; B22F 7/00
(52) U.S. Cl. ............................. 75/230; 75/232; 75/236; 75/244; 75/247; 419/10; 419/29; 428/553
(58) Field of Search .................... 75/230, 232, 236, 75/244, 247; 419/10, 29; 428/553

(56) References Cited

U.S. PATENT DOCUMENTS

| | | | | | |
|---|---|---|---|---|---|
| 4,941,919 A | * | 7/1990 | Asada et al. | ................... | 75/235 |
| 5,303,617 A | * | 4/1994 | Asada et al. | ................... | 75/231 |
| 6,165,246 A | * | 12/2000 | Kira et al. | ................... | 75/247 |
| 6,303,235 B1 | * | 10/2001 | Kawakami et al. | ......... | 428/553 |

FOREIGN PATENT DOCUMENTS

JP   2000-81523   3/2001

* cited by examiner

*Primary Examiner*—Ngoclan Mai
(74) *Attorney, Agent, or Firm*—Browdy and Neimark, P.L.L.C.

(57) ABSTRACT

A copper-based sliding material produced by sintering, comprising at least two phases of copper and/or copper alloys which phases have hardness levels different form each other, and hard particles with an average particle size of 0.1 to 10 $\mu$m which are dispersed in at least one phase with the exception of a softest phase in an amount of 0.1 to 10 vol. % of the whole copper-based sliding material, said sliding material satisfying $(H2/H1) \geq 1.2$ in which H1 is the Vickers hardness of the softest phase and in which H2 is the Vickers hardness of a phase hardest in hardness including said hard particles.

14 Claims, 6 Drawing Sheets

COPPER-BASED SLIDING MATERIAL, METHOD OF MANUFACTURING THE SAME, AND SLIDING BEARING

BACKGROUND OF THE INVENTION

The present invention relates to a copper-based sliding material whose fatigue resistance and anti-seizure property are improved, a method of manufacturing this copper-based sliding material, and a sliding bearing.

There is a bearing in which Kelmet is used as a copper-based sliding material. A Kelmet bearing in which a copper-and-lead-based sintered alloy is bonded onto a back metal made of steel and in which an overlay is bonded onto the copper-and-lead-base sintered alloy is used as a sliding bearing for an automobile engine, etc. In this Kelmet bearing, the lead (Pb) contained in the copper-and-lead-based sintered alloy, which is an underlayer, is present on a sliding surface even when the overlay is worn and, therefore, the anti-seizure property of the Kelmet bearing is good.

In conventional copper-based sliding materials represented by the Kelmet bearing, the anti-seizure property is thus improved by adding lead (about 20 mass %). However, because lead has an adverse effect on the environment, it is preferred that this element be contained as little as possible or be not used.

Furthermore, in recent automobile engines there are adopted high-rotation design and high-output design, and the temperature and specific load of bearings tend to become high.

In the conventional Kelmet bearing, however, the content of lead that is soft and that has a low melting point is as high as about 20 mass % and, therefore, the conventional Kelmet bearing has low strength and there is a problem in fatigue resistance specially at high temperatures and under high specific loads.

SUMMARY OF THE INVENTION

As disclosed by the applicant in JP-A-2000-81523, the addition of hard particles is effective in improving wear resistance.

However, since bismuth (Bi) is used in the invention of JP-A-2000-81523, the material disclosed in the application is inferior in load carrying capacity. Further, in a case where in the material the grain size of hard particles is large, a load acting on one hard particle increases and a shearing force generated at the boundary with the matrix increases, with the result that fatigue is apt to occur from this boundary, having an adverse effect on the fatigue resistance thereof. In addition, hard particles of large size are apt to fall off easily, and in a case where they fall off, the bismuth that is prevented by the presence of hard particles from being carried away becomes apt to be carried away from a sliding surface and the embeddability brought about by bismuth is lost. This posed the problem that a bearing and its counterpart are damaged, and this causes such unsolved problems as the wear resistance and anti-seizure property are deteriorated by abrasive wear.

The invention was completed in taking the above situation into consideration. Therefore, the object of the invention is to provide a copper-based sliding material that ensures a good anti-seizure property even without the use of lead, high fatigue resistance even at high temperatures and under high specific loads, and high wear resistance even under conditions close to those of boundary lubrication, a method of manufacturing the copper-based sliding material, and a sliding bearing made of the copper-based sliding material.

The inventors have found that, in a case where a copper-based sliding material has a structure in which a soft phase and a hard phase are mixed with each other, its anti-seizure property and fatigue resistance are improved.

In other words, on the surface of a sliding material whose structure has a soft phase and a hard phase both mixed with each other, the hard phase becomes convex with the soft phase becoming concave under load or due to sliding wear. Because a lubricating oil is held in this concave portion, the anti-seizure property is improved. The inventors have also found that a concave-convex relationship capable of acting as the reservoir of a lubricating oil is brought about between the soft phase and the hard phase under the condition of $(H2/H1) \geq 1.2$ where H1 represents the Vickers hardness of the soft phase and H2 represents the Vickers hardness of the hard phase.

Furthermore, because of the presence of the soft and hard phases mixed with each other in the surface portion of the sliding material, the soft phase provides conformability and the hard phase receives loads. Usually, a load received by the hard phase serves as a shearing force acting on the boundary between the hard phase and the soft phase. However, when the hard phase and the soft phase are composed of copper or a copper alloy, the wettability of the phases becomes good, so that a clear boundary between the two phases comes to disappear. Therefore, a load received by the hard phase is distributed in a region defined between the hard phase and the soft phase, resulting in improved fatigue resistance.

Thus, according to the first aspect of the invention, the copper-based sliding material is provided with a structure in which both of a soft phase and a hard phase are mixed with each other, the Vickers hardness of the hard phase being not less than 1.2 times that of the soft phase, so that an excellent anti-seizure property can be obtained even without containing lead. Furthermore, the conformability of the sliding material of the invention is good and the fatigue resistance thereof is high.

In addition, the hard phase that becomes convex in shape and receives the load of a counterpart member contains hard particles. In general, since hard particles improve wear resistance and, at the same time, have the functions of smoothing a counterpart shaft and of removing the bearing alloy components that have adhered, the hard particles improve the anti-seizure property. Moreover, microscopically observed, the load received by the hard phase is received by the hard particles included in the hard phase. The size of the hard particles is as small as 0.1 to 10 μm. Thus, when the content of hard particles is the same, the number of hard particles is large, so that a load acting on each hard particle becomes small, which makes a shearing force acting between hard particles and the matrix small and which makes the surface area of the hard particles large, whereby the hard particles are less apt to fall off and the fatigue resistance is improved. When the content of the hard particles is less than 0.1 vol. %, the hard particles are ineffective in improving the anti-seizure property, wear resistance and fatigue resistance. On the other hand, at a content exceeding 10 vol. %, the attacking property of the sliding material to the counterpart member by the hard particles increases and the anti-seizure property is deteriorated.

According to the second aspect of the invention, the hard particles are ones of at least one kind from the group consisting of borides of metal, silicides of metal, oxides of metal, nitrides of metal, carbides of metal and intermetallic compounds.

According to the third aspect of the invention, the copper alloy phase has a composition of not more than 15 mass % Sn; at least one kind not less than 40 mass % in total selected from the group consisting of Ni, P, Zn, Al, Co, Mn, Ag and Fe; and the balance of Cu and incidental impurities. The reasons therefor is described below.

(a) Not more than 15 mass % Sn

Sn strengthens the matrix and improves fatigue resistance. Furthermore, the addition Sn improves the anti-seizure property of a copper alloy. At a content exceeding 15 mass % Cu, large amounts of Cu-Sn-based intermetallic compounds are generated, resulting in embrittlement.

(b) At least one kind not more than 40 mass % in total selected from the group consisting of Ni, P, Zn, Al, Co, Mn, Ag and Fe.

Each of these elements strengthens the matrix and improves fatigue resistance. Especially, Mn, Co, Ni and Fe are basically present in the hard copper alloy phase because the migration of atoms is less apt to occur at sintering temperatures of 800 to 920° C. and, therefore, each of Mn, Co, Ni and Fe acts favorably in a case where a difference in hardness between the hard copper alloy phase and the soft copper phase is to be obtained. When the content of these elements exceeds 40 mass % in total, the hardness of the whole copper-based sintered alloy becomes too high and this is undesirable for a bearing material.

In this case, unless a clear hardness difference between the hard copper alloy phase and the soft copper alloy phase is obtained, the hardness of the hard copper alloy phase does not become not less than 1.2 times that of the soft copper alloy phase in terms of Vickers hardness. For this purpose, it is preferred that elements for strengthening the copper alloy phase (strengthening elements) do not diffuse into the soft phase. However, if strengthening elements do not at all diffuse into the soft phase, the boundary between the hard copper alloy phase and the soft copper alloy phase becomes clear and this is unfavorable in terms of fatigue resistance.

Regarding this respect, the means explained below is adopted according to the fourth aspect of the invention. Namely, after the mixing of at least two kinds of copper alloy powder or the mixing of pure copper powder with at least one kind of copper alloy powder, a mixture is sintered. Therefore, because the at least one kind of powder contains elements for increasing hardness (Ni, P, Zn, Al, Co, Mn, Ag and Fe), the hard phase and soft phase can be easily formed, and the prescribed hardness difference between the two phases can be easily obtained. In addition, because both the soft phase and the hard phase are respectively made of-pure copper and a copper alloy to thereby have good wettability, a part of each of the strengthening elements included in the hard phase diffuses into the soft phase, making the boundary between the two phases unclear.

According to the fifth aspect of the invention, a heat treatment at a temperature of 200 to 500° C. is performed for 1 to 20 hours after the final step of sintering, so that the hardness is further increased because of age hardening, for example, in a Cu—Sn—Ni alloy. However, because no age hardening occurs in a Cu—Sn alloy, it is easy to obtain the hardness difference between the soft copper alloy phase and the hard copper alloy. Moreover, even in a case where the hard copper alloy phase is made of compositions that do not bring about age hardening, only the soft copper alloy phase can be softened by performing heat treatment after the final rolling by use of rolls when both of the hard and soft copper alloy phases are combined, because the softening temperature of each alloy phase after work hardening differs in dependence on the composition. This also enable the hardness difference to be further increased.

According to the sixth aspect of the invention, a bearing is formed by bonding the above copper-based sliding material onto a back metal, so that the bearing can be used as a sliding bearing of a high-rotation and high-output automobile engine.

According to the seventh aspect of the invention, an overlay comprising a metal and/or a resin is provided on the surface of the copper-based sliding material, so that it is possible to obtain a sliding bearing that is excellent in initial conformability, embeddability of foreign matter and the anti-seizure property.

DETAILED DESCRIPTION OF THE PREFERRED EMBODIMENTS

An embodiment of the invention applied to an bearing for an automobile engine is described below by referring to the drawings.

Figure 5:
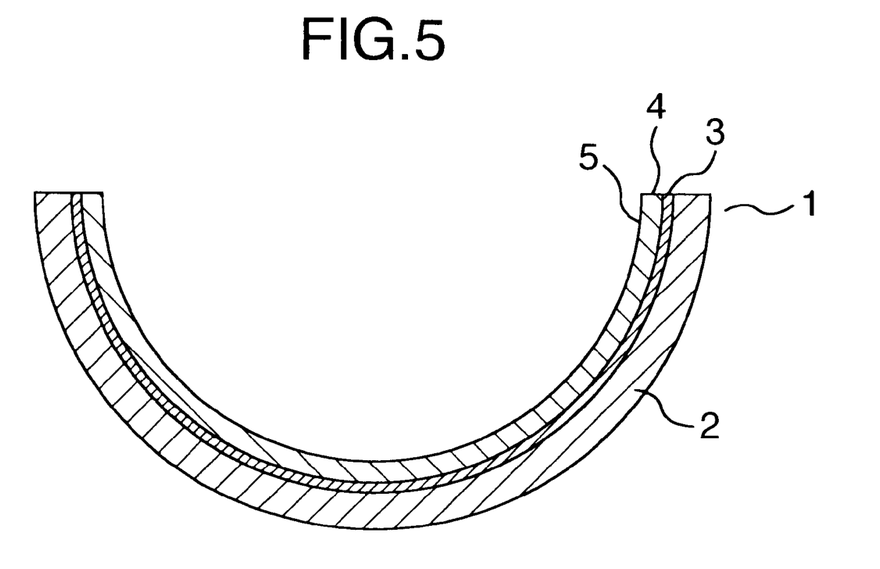
FIG. 5 is a sectional view of the half sliding bearing.

In FIG. 5, a bearing 1, which is called a half sliding bearing, is used as a sliding bearing for an automobile engine, etc. while combining two pieces of the half sliding bearing. The bearing 1 is produced by the steps of: bonding a copper-based sliding material (a bearing alloy) 4 relating to the invention onto a back metal 2 made of, for example, a steel sheet of thin thickness through a bonding layer 3 made of a copper plating layer; and forming an overlay 5 of a soft material, resin, etc. on the surface of the copper-based sliding material 4.

Figure 1:
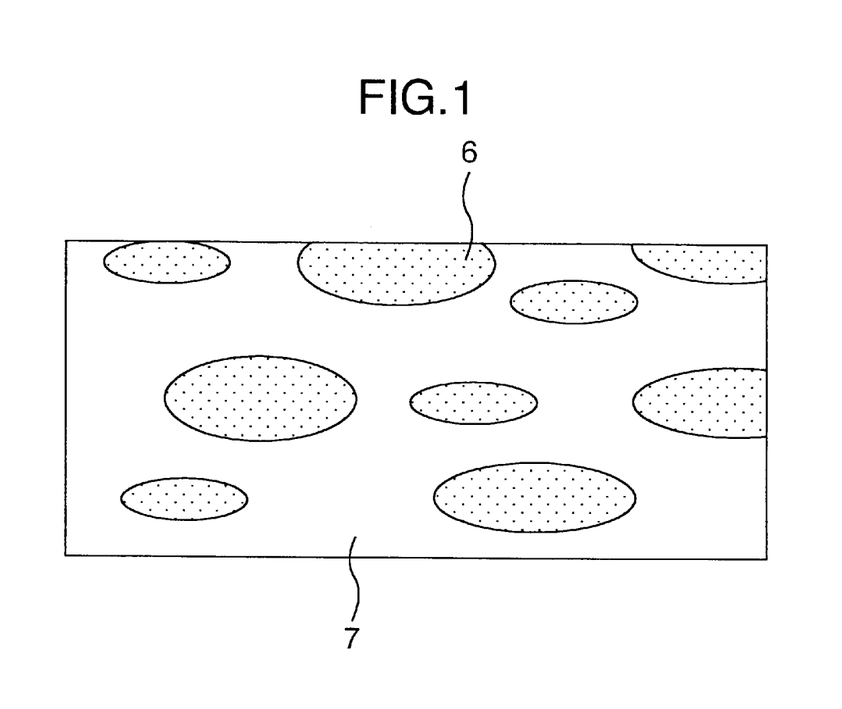
FIG. 1 a schematic view showing the structure of the sliding material in an embodiment of the invention.
Figure 4:
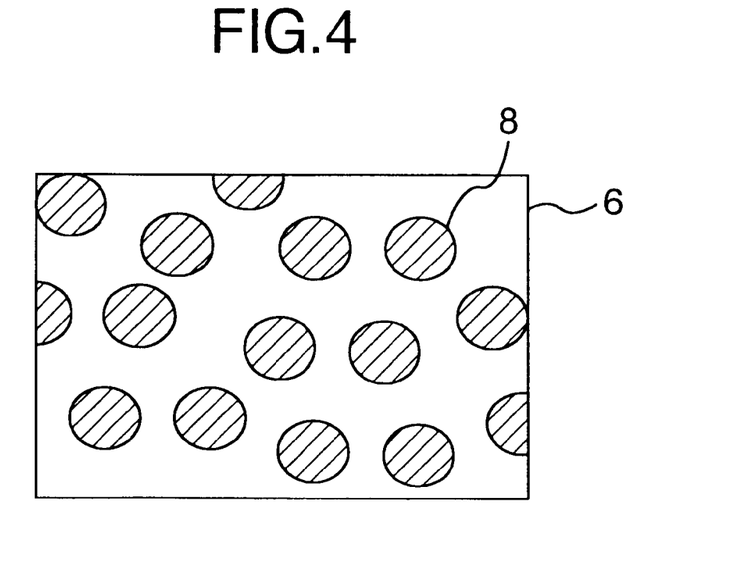
FIG. 4 is a schematic view of the structure of the hard copper alloy phase.

The structure of the copper-based sliding material 4 is such that two or more copper alloy phases are mixed with each other as shown in FIG. 1. In FIG. 1, two copper alloy phases 6, 7 are mixed with each other. These copper alloy phases 6, 7 have different hardness levels. As shown in FIG. 4, hard particles 8 composed of at least one of borides of metal, suicides of metal, oxides of metal, nitrides of metal, carbides of metal and intermetallic compounds are dispersed in the hard copper alloy phase 6. When the Vickers hardness of the soft copper alloy phase 7 (hereinafter referred to as the soft phase) is denoted by H1 and that of the hard copper alloy phase 6 (hereinafter referred to as the hard phase) is denoted by H2, the relationship H2/H1≧1.2 is attained.

Next, a method of manufacturing the half-split bearing 1 in which the copper-based sliding material 4 has two or more copper alloy phases is described.

First, at least two kinds of copper alloy powder are mixed or a pure copper powder and at least one kind of copper alloy powder are mixed. In a case where at least two kinds of copper alloy powder are mixed, the copper alloy powder has a composition consisting of not more than 15 mass % Sn and the balance of Cu or another composition consisting of not more than 15 mass % Sn, at least one kind not more than 40 mass % in total selected from the group consisting of strengthening elements of Ni, P, Zn, Al, Co, Mn , Ag and Fe, and the balance of Cu. At least one kind of the copper alloy powders excluding copper alloy powder softest in hardness is made to contain dispersed hard particles of 0.1 to 10 vol. % with a particle size of 0.1 to 10 μm.

In another case where a pure copper powder and at least one kind of copper alloy powder are mixed, the copper alloy powder has a composition consisting of not more than 15 mass % Sn and the balance Cu or has another composition consisting of not more than 15 mass % Sn, at least one kind not more than 40 mass % in total selected from the group consisting of strengthening elements of Ni, P, Zn, Al, Co, Mn, Ag and Fe, and the balance Cu. At least one kind of the copper alloy powders is made to contain dispersed hard particles of 0.1 to 10 vol. % with a particle size of 0.1 to 10 μm.

In this case, a powder prepared by the mechanical alloying method or the pulverization method was used as the above copper alloy powder containing hard particles. It is preferred that the average particle size of each powder of the above copper alloy and pure copper be not more than 250 μm.

The above powder mixture is uniformly scattered on a steel sheet (the back metal 2) to the surface on which a copper plating (the bonding layer 3) is formed to increase the adhesion between the back metal and the pure copper powder or the copper alloy powder. Then, they are sintered at a temperature of 800 to 920° C. for about 15 minutes in a reducing atmosphere and are then rolled by use of rolls. After this rolling by use of rolls, sintering is again performed under the same conditions as the above conditions and rolling by use of rolls is then performed. A bimetal in which the copper-based sliding material 4 is bonded onto the steel sheet is thus made.

In a case where a pure copper powder and a copper alloy (for example, Cu—Sn—Ni) powder are sintered, Sn contained in the copper alloy powder diffuses into the pure copper powder to thereby form a Cu—Sn alloy, so that Sn comes to be almost uniformly contained in the whole copper-based sliding material 4. On the other hand, regarding the strengthening elements, such as Ni, P, Zn, Al, Co, Mn, Ag and Fe, and particularly, Ni, Co, Mn and Fe, the migration of the atoms of each of these elements is less apt to occur insofar as the sintering temperatures of 800 to 920° C. is concerned, so that these strengthening elements hardly diffuse into other powders and remain in the copper alloy as they are.

After forming the bimetal as mentioned above, the bimetal is cut to have a predetermined width and a predetermined length, and is bent in a semicircular form, the surface of the copper-based sliding material 4 being finished by machining, and the overlay 5 is then provided. When a hardness difference between the soft copper alloy phase and the hard copper alloy phase is intended to be further increased, a heat treatment at 200 to 500° C. for 1 to 20 hours may be performed after the final step of sintering in the period but prior to the step of forming the overlay 5.

The half bearing 1 shown in FIG. 5 is thus formed. Two pieces of this bearing 1 are butted in cylindrical form and used as a main bearing or a connecting rod bearing that receives the crankshaft of an automobile engine.

Figure 6:
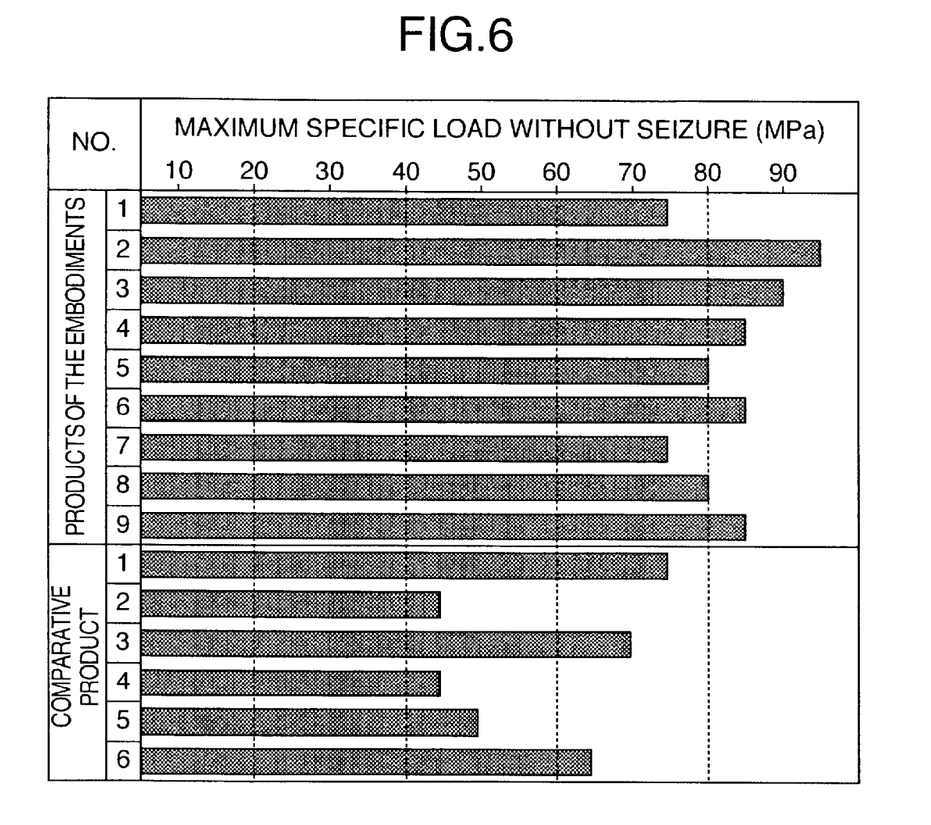
FIG. 6 is a graph showing results of a seizure test.
Figure 7:
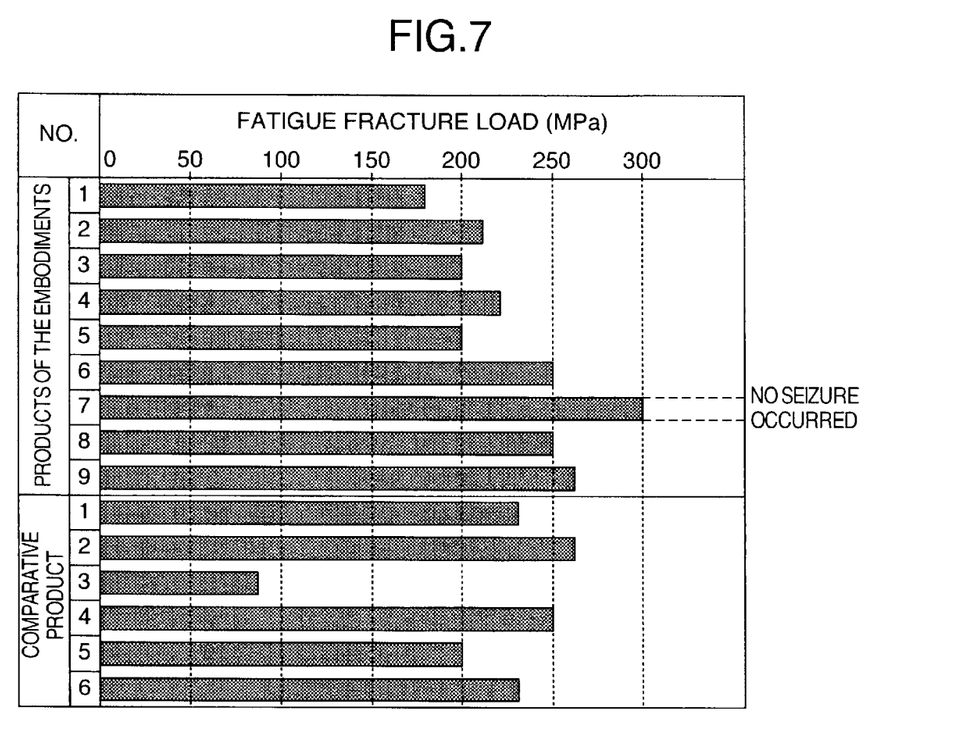
FIG. 7 is a graph showing results of a fatigue test.
Figure 8:
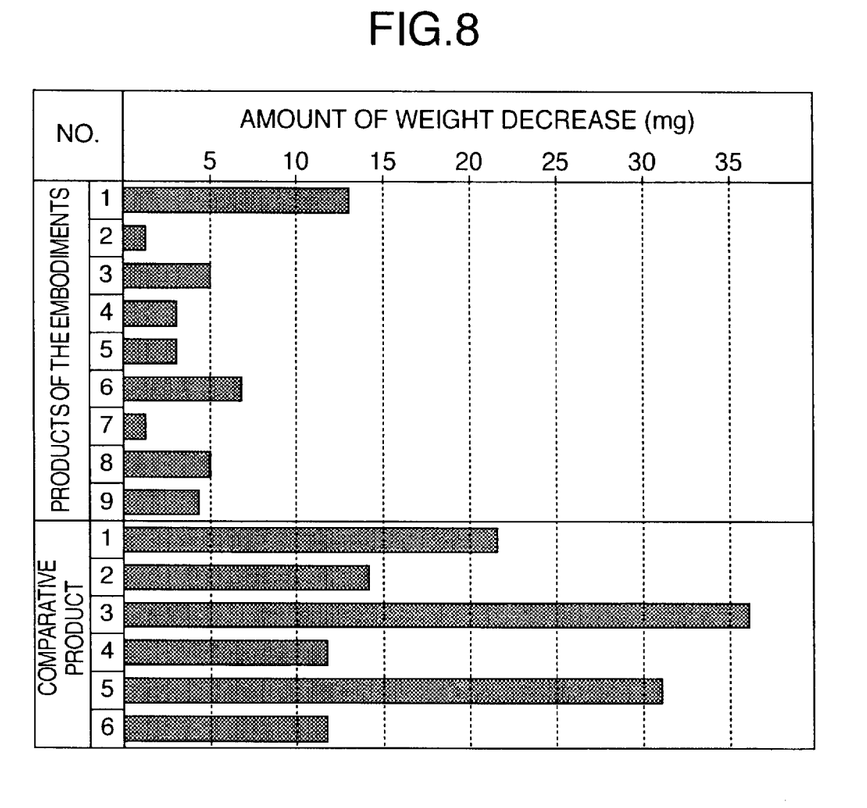
FIG. 8 is a graph showing results of a wear test.

The inventors made inventive products and comparative products by mixing powders of the compositions shown in TABLE 1 and performed a Vickers hardness test of the hard and soft copper alloy phases, seizure test, fatigue test and wear test regarding these products. Results of the Vickers hardness test are shown in TABLE 1. Results of the seizure test, fatigue test and wear test are shown in FIG. 6, FIG. 7 and FIG. 8, respectively.

In TABLE 1, Powder A and Powder B are powders mixed for performing the sintering. The numeral shown before each element or chemical formula indicates the content thereof (mass %). Powder A of the inventive products 1 to 7 and 9 and comparative products 2, 4 and 5 was prepared by a mechanical alloying method and Powder B of the inventive product 8 was prepared by a pulverization method. WC particles with an average particle size of 1.5 μm were used in the inventive products 1–4, 6, 7 and 9 and comparative products 2,4 and 6, WC particles with an average particle size of 15 μm were used in the comparative product 5, $MO_2C$ particles with an average particle size of 2 μm were used in the inventive product 5, and Ni-B particles with an average particle size of 5 μm were used in the inventive product 8.

In the Vickers hardness test, hardness was measured on sections by means of a micro Vickers hardness tester.

In the seizure test, a rotation shaft driven by a motor was supported by a bearing similar to the bearing shown in FIG. 4 (in which, however, no overlay 5 was provided in order to more clearly examine the characteristics of the copper-based sliding material 4), a running-in being performed for the first 60 minutes, the specific load on the bearing being then increased 5 MPa by 5 MPa while reducing the volume of lubricating oil, and operation was continued for 10 minutes at each specific load on the bearing. A specific load on the bearing that is lower one step than another specific load on the bearing at which the back face temperature of the bearing exceeded 220° C. or at which the driving current of the motor driving the rotation shaft showed an abnormal value was regarded as a maximum specific load without seizure. Other test conditions of the seizure test are shown in TABLE 2.

In the fatigue test, a small piece made of the copper-based sliding material 4 alone was used, and test loads were applied to the small piece. The test loads were increased 10 MPa by 10 MPa while starting from 50 MPa. Test loads were sinusoidally applied 50,000 times for each test load, and a test load at which a crack occurred was regarded as the fatigue fracture load.

TABLE 1

| | No. | Composition of Powder A (mass %) | Composition of Powder B (mass %) | Mixing Ratio (mass %) | | Vickers Hardness | | |
|---|---|---|---|---|---|---|---|---|
| | | | | Powder A | Powder B | H2 | H1 | H2/H1 |
| Products of the invention | 1 | Cu-6Sn-2 vol % WC | Cu | 50 | 50 | 162 | 97 | 1.7 |
| | 2 | Cu-6Sn-10Ni-25 vol % WC | Cu | 30 | 70 | 642 | 88 | 7.3 |
| | 3 | Cu-6Sn-10Ni-25 vol % WC | Cu-2Sn | 10 | 90 | 618 | 100 | 6.2 |
| | 4 | Cu-6Sn-10Ni-25 vol % WC | Cu-6Sn | 20 | 80 | 642 | 127 | 4.9 |

TABLE 1-continued

|  | No. | Composition of Powder A (mass %) | Composition of Powder B (mass %) | Mixing Ratio (mass %) Powder A | Powder B | Vickers Hardness H2 | H1 | H2/H1 |
|---|---|---|---|---|---|---|---|---|
|  | 5 | Cu-6Sn-25 vol % Mo2C | Cu | 20 | 80 | 539 | 93 | 5.8 |
|  | 6 | Cu-6Sn-10Ni-10 vol % WC | Cu-2Sn | 50 | 50 | 315 | 113 | 2.8 |
|  | 7 | Cu-6Sn-10Ni-10 vol % WC | Cu-6Sn-10Ni | 70 | 30 | 331 | 150 | 2.2 |
|  | 8 | Cu-15Ni-1.5B | Cu-6Sn | 50 | 50 | 305 | 105 | 2.9 |
|  | 9 | Cu-6Sn-10Ni-10 vol % WC | Cu-2Sn | 50 | 50 | 430 | 120 | 3.6 |
| Comparative products | 1 | Cu-6Sn-10Ni | Cu-2Sn | 50 | 50 | 158 | 110 | 1.4 |
|  | 2 | Cu-6Sn-2 vol % WC | Cu-6Sn-10Ni | 70 | 30 | 159 | 152 | 1.0 |
|  | 3 | Cu-3.5Sn-23Pb | — | 100 | — | 87 | — | — |
|  | 4 | Cu-6Sn-10Ni-25 vol % WC | Cu-2Sn | 50 | 50 | 577 | 105 | 5.5 |
|  | 5 | Cu-6Sn-10Ni-10 vol % WC | Cu-2Sn | 50 | 50 | 320 | 108 | 3.0 |
|  | 6 | Cu-6Sn-10Ni | WC | 88 | 12 | 157 | — | — |

TABLE 2

| Item | Condition |
|---|---|
| Shaft diameter | 53 mm |
| Bearing width | 13 mm |
| Peripheral speed | 10 m/second |
| Lubricating oil | SAE #20 |
| Oil supply rate | 12.5 ml/minute |
| Shaft material | JIS-S55C quenched product |
| Shaft roughness | Rmax not more than 1.0 µm |

Results of the above tests are analyzed.

The comparative product 3 has a high lead content of 23 mass % and corresponds to a conventional Kelmet bearing. A comparison of this comparative product 3 with the inventive products 1 to 9 reveals that the inventive products 1 to 9 are superior to the comparative product 3 in fatigue resistance and wear resistance although the anti-seizure property of the inventive products 1 to 9 is a slightly better than that of the comparative product 3. Because the inventive products 1 to 9 do not contain lead, they are excellent in fatigue strength, and their anti-seizure property is maintained to be a good level and their fatigue resistance is improved even when they are used in high-rotation and high-output automobile engines.

The reasons why the inventive products 1 to 9 have an anti-seizure property equal to or a slightly better than that of a Kelmet bearing in spite of the absence of lead and are excellent in fatigue resistance and in wear resistance is thought to be as follows.

Figure 2:
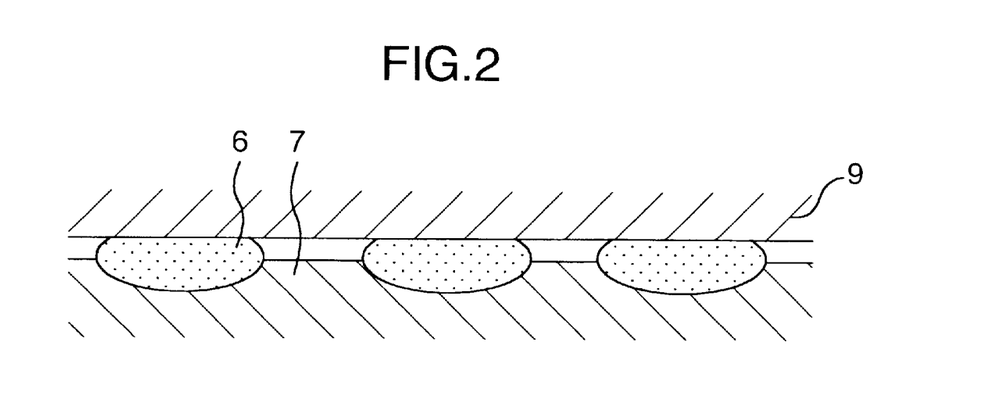
FIG. 2 is a sectional view of the structure of the sliding material shown in FIG. 1 for an explanation of the action of holding a lubricating oil.

First, the anti-seizure property is described. The structure of the inventive products 1 to 9 is such that, as described above, the hard copper alloy phase 6 and soft copper alloy phase 7 are mixed with each other. When the hard copper alloy phase 6 and soft copper alloy phase 7 are mixed with each other as in these products, the soft copper alloy phase 7 becomes concave under load or due to the sliding wear caused by a counterpart shaft as schematically shown in FIG. 2, and the lubricating oil is held in the concave portions, with the result that the anti-seizure property is thought to be improved.

For example, in comparing the inventive product 1 with the comparative product 2, the inventive product 1 is superior in the anti-seizure property. Although the composition of Powder A of both is the same, Powder B of the inventive product 1 is pure copper and that of the comparative product 2 is a copper alloy powder containing the strengthening element nickel. Therefore, the hardness of the inventive product 1 is nonuniform because of the mixed presence of the hard copper alloy phase 6 and soft copper alloy phase 7, whereas the hardness difference of the comparative product 2 is not large so much. In the inventive product 1 with nonuniform hardness, the soft copper alloy phase 7 becomes concave and holds a lubricating oil. However, the comparative product 2 with almost uniform hardness brings about no concave portion and hence does not provide the function of holding a lubricating oil, resulting in an inferior anti-seizure property.

It has been ascertained that the hardness difference between the hard copper alloy phase 6 and the soft copper alloy phase 7, which hardness difference ensures the soft copper alloy phase 7 becomes concave and which hardness difference produces the effect of holding a lubricating oil, is expressed by the relationship (H2/H1)≧1.2 where the Vickers hardness of the soft copper alloy phase 7 is denoted by H1 and the Vickers hardness of the hard copper alloy phase 6 is denoted by H2. In the comparative product 2, the hardness ratio of Powder A to Powder B (H2/H1) is 1.0. In the comparative product 2, therefore, the degree of concavity in the soft copper alloy phase 7 is low and the function of holding a lubricating oil is low, with the result that the anti-seizure property is inferior.

Figure 3A:
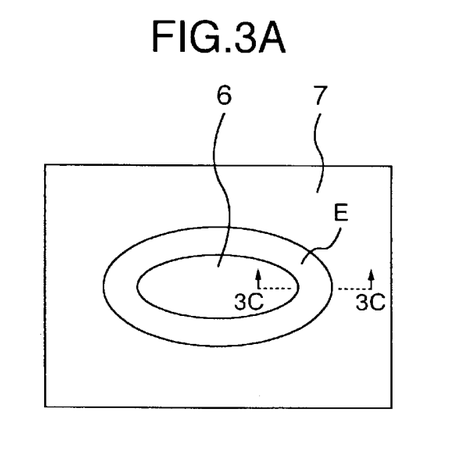
FIGS. 3A and 3B are schematic views of the hard copper alloy phase and the soft copper alloy phase for an explanation of the action of improving fatigue strength.
Figure 3B:
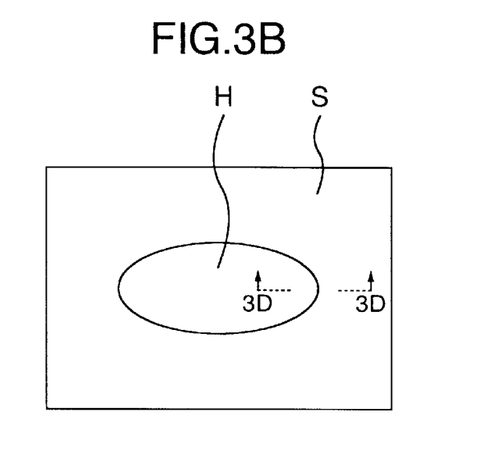
Figure 3C:
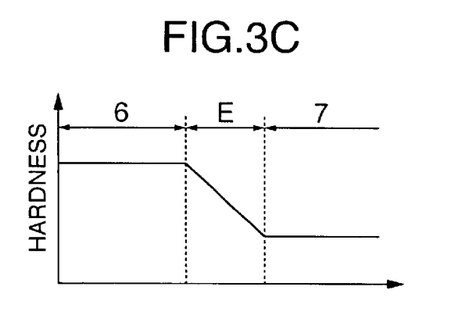
FIGS. 3C and 3D are graphs showing changes in hardness taken along line 3C—3C in FIG. 3A and along line 3D—3D in FIG. 3B, respectively.

Next, the reasons why the inventive products 1 to 7 show excellent fatigue resistance is considered below. In general, when a hard phase and a soft phase are mixed with each other in the surface portion of a sliding material, the soft phase provides conformability and the hard phase receives loads. As shown in FIG. 3E, the load received by the hard phase acts as the shearing force F at the boundary defined between the hard phase H and the soft phase S, and the boundary defined between the two phases on which the shearing force acts repeatedly initiates fatigue, and a crack occurs.

Figure 3D:
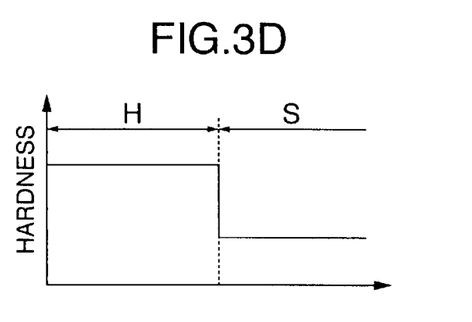
Figure 3E:
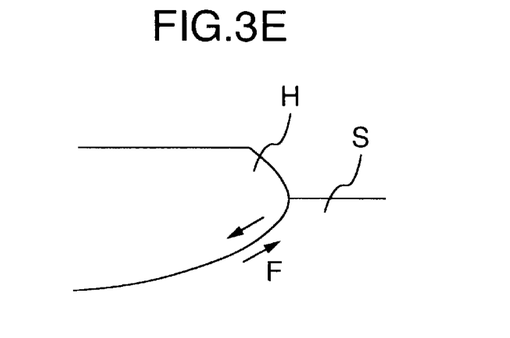
FIG. 3E is a schematic view of the hard phase and the soft phase for an explaining the action of improving fatigue strength.

In this case, as shown in FIG. 3D, when hardness changes abruptly at the boundary between the hard phase H and the soft phase S, the boundary between the hard phase H and the soft phase S appears clearly and the shearing force F is concentrated at the boundary, resulting in early fatigue. However, because in the inventive products 1 to 9 both the hard phase 6 and the soft phase 7 are formed of a copper alloy, the wettability of the hard phase H and the soft phase S is good and the strengthening elements such as nickel and iron in the hard copper alloy phase 6 diffuse, although it is slight, into the soft copper alloy phase 7, with the result that in the boundary portion between the two copper alloy phases 6 and 7 the contents of strengthening elements decrease gradually from the side of the hard copper alloy phase 6 toward the soft copper alloy phase 7. As a result, in the boundary portion between the hard copper alloy phase 6 and the soft copper alloy phase 7, hardness changes gradually as shown in FIG. 3C, not abruptly, with the result that the clear boundary between the two phases disappears. For this reason, the load received by the hard copper alloy phase 6 becomes distributed to the region indicated by E in FIG. 3A and fatigue resistance is improved.

Moreover, the hard phase H contains hard particles. The hard particles contribute to an improvement in wear resistance. Therefore, the copper-based sliding material 4 of the invention can be used in such parts as to be slid under conditions close to those of boundary lubrication, such as piston bushes and piston-boss bushes.

A load received by the hard phase H as mentioned above is received, when microscopically observed in the hard phase H, by the hard particles present as the hard portion of the hard phase. The hard particles are as small as 0.1 to 10 μm in average particle size. For this reason, when the content of hard particles is the same, a load received by each hard particle becomes small because of a large number of hard particles and the surface area of hard particles is large, so that hard particles are less apt to fall off and fatigue resistance is improved.

However, when the content of hard particles exceeds 10 vol. %, the anti-seizure property deteriorates. For example, although the inventive product 3 and comparative product 4 have the same compositions of Powder A and Powder B, the content of hard particles (WC) is as high as 25 vol. % in the comparative product 4, so that the anti-seizure property deteriorates. This is because the attacking to a counterpart member by hard particles increases when the number of hard particles is large.

When the average particle size of hard particle exceeds 10 μm, fatigue resistance decreases. Although the inventive product 6 and the comparative product 5 have the same mixing proportions of Powder A and Powder B, the hard particles used have different particle sizes. In the comparative product 5, the average particle size exceeds 10 μm. For this reason, the comparative product 5 is inferior in fatigue resistance and has also increased attacking to the counterpart member. Therefore, the anti-seizure property deteriorates and wear resistance also decreases.

As mentioned above, in a case where there is no hardness difference between the hard copper alloy phase 6 and the soft copper alloy phase 7, the anti-seizure property is not improved. Particularly in Mn, Co, Ni and Fe among other strengthening elements, the migration of the atoms does not easily occur at the sintering temperatures of 800 to 920° C., so that these elements are favorable for obtaining a hardness difference between the hard copper alloy phase and the soft copper alloy phase. In other word, strengthening elements regarding which the migration of atoms occurs easily diffuse during sintering from the hard copper alloy into the soft copper alloy, so that the hardness of the hard copper alloy phase decreases and, at the same time, the hardness of the soft copper alloy phase increases, resulting in a reduced hardness difference between the two phases. In Mn, Co, Ni and Fe in which the migration of atoms does not easily occur, the migration of atoms to the soft copper alloy phase occurs little during the sintering and the hardness of the hard copper alloy phase is maintained. Therefore, these elements are effective in maintaining the hardness ratio of the hard copper alloy phase 6 to the soft copper alloy phase 7 at a level not less than 1.2.

As will be understood from a comparison between the inventive product 6 and the inventive product 9, the anti-seizure property and fatigue resistance are further improved when the hardness difference between the hard copper alloy phase 6 and the soft copper alloy phase 7 increases. In order to further increase the hardness difference between the two phases 6 and 7, it is preferred that heat treatment be performed after the final step of sintering. In the inventive product 6 and the inventive product 9, the composition and mixing ratio of Powder A (Cu-6Sn-10Ni-WC10 vol. %) and Powder B (Cu-2Sn) are the same. However, a difference lies in the fact that the inventive product 9 is subjected to a heat treatment (at 350° C. for 7 hours) after the final rolling by use of rolls.

Although a Cu—Sn—Ni alloy phase has the age hardening property, a Cu—Sn alloy phase does not have this property. Therefore, in the inventive product 9 subjected to heat treatment, the Cu—Sn—Ni alloy phase, which provides the hard copper alloy phase 6, undergoes the age hardening and increases in hardness, so that the hardness difference from the soft copper alloy phase 7 increases. As a result of this, the hardness ratio of the hard copper alloy phase 6 to the soft copper alloy phase 7 is as high as 3.6 in the inventive product 9, whereas the hardness ratio of the inventive product 6 is in such a level as to be 2.8. In the inventive product 9 having a high hardness ratio of the hard copper alloy phase to the soft copper alloy phase, its fatigue resistance is better than that of the inventive product 6 although the anti-seizure property is the same as that of the inventive product 6.

The invention is not limited to the embodiments described above and shown in the drawings and may be changed in various manners without departing from the spirit and scope of the invention. For example, the use of the sliding material of the invention is not limited to automobile engines.

What is claimed is:

1. A copper-based sliding material produced by sintering, comprising at least two phases of copper and/or copper alloys which phases have hardness levels different form each other, and hard particles with an average particle size of 0.1 to 10 μm which are dispersed in at least one phase with the exception of a phase softest in hardness in an amount of 0.1 to 10 vol. % of the whole copper-based sliding material, said sliding material satisfying (H2/H1)≧1.2 in which H1 is the Vickers hardness of the phase softest in hardness and in which H2 is the Vickers hardness of a phase hardest in hardness including said hard particles.

2. A copper-based sliding material according to claim 1, wherein said hard particles are ones of at least one kind selected from the group consisting of borides of metal, silicides of metal, oxides of metal, nitrides of metal, carbides of metal and intermetallic compounds.

3. A copper-based sliding material according to claim 1, wherein said at least two phases of copper and/or copper alloys have compositions different from each other, and each of said at least two phases consists essentially, by weight, of: not more than 15% Sn; at least one kind not more than 40% in total selected from the group consisting of Ni, P, Zn, Al, Co, Mn, Ag and Fe; and the balance of Cu.

4. A copper-based sliding material according to claim 2, wherein said at least two phases of copper and/or copper alloys have compositions different from each other, and each of said at least two phases consists essentially, by weight, of: not more than 15% Sn; at least one kind not more than 40% in total selected from the group consisting of Ni, P, Zn, Al, Co, Mn, Ag and Fe; and the balance of Cu.

5. A method of manufacturing a copper-based sliding material of any one of claim 1 to 4, comprising mixing at least two kinds of powder selected from the combinations consisting of: at least two kinds of copper alloy powder; and a pure copper powder and at least one kind of copper alloy powder, in at least one kind of which powders hard particles are dispersed with the exception of a powder softest in hardness, so that a mixture is obtained, and then sintering the mixture at least once.

6. A method of manufacturing a copper-based sliding material according to claim 5, further comprising, after a final sintering, performing a heat treatment at a temperature of 200 to 500° C. for 1 to 20 hours.

7. A sliding bearing comprising a back metal, and a copper-based sliding material according to claim 1 which is bonded to said back metal.

8. A sliding bearing comprising a back metal, and a copper-based sliding material according to claim 2 which is bonded to said back metal.

9. A sliding bearing comprising a back metal, and a copper-based sliding material according to claim 3 which is bonded to said back metal.

10. A sliding bearing comprising a back metal, and a copper-based sliding material according to claim 4 which is bonded to said back metal.

11. A sliding bearing according to claim 7, further comprising an overlay layer made of a material selected from the group consisting of a metal and a resin which overlay layer is formed on said copper-based sliding material.

12. A sliding bearing according to claim 8, further comprising an overlay layer made of a material selected from the group consisting of a metal and a resin which overlay layer is formed on said copper-based sliding material.

13. A sliding bearing according to claim 9, further comprising an overlay layer made of a material selected from the group consisting of a metal and a resin which overlay layer is formed on said copper-based sliding material.

14. A sliding bearing according to claim 10, further comprising an overlay layer made of a material selected from the group consisting of a metal and a resin which overlay layer is formed on said copper-based sliding material.

* * * * *